Patented Sept. 26, 1939

2,174,450

UNITED STATES PATENT OFFICE 2,174,450

METHOD FOR TREATING ROCK AND EVAPORATED SALT

Marnell Segura, Jefferson Island, La., assignor to Jefferson Island Salt Mining Company, Louisville, Ky., a corporation of Delaware No Drawing. Application September 12, 1938, Serial No. 229,603

5 Claims. (Cl. 99—143)

This invention relates to salt and its manufacture, and more particularly to a method for treating rock and evaporated salt for the purpose of maintaining the same in a permanently soft and moist condition, and to the product resulting from such a method.

Many efforts have heretobefore been made to prepare salt in such a manner as to maintain it in a dry, free-flowing condition, to which end it has been customary to add to the salt water-insoluble materials such as tri-calcium phosphate, magnesium carbonate and calcium carbonate. However, when salt treated with these materials is placed in solution it results in an alkaline reaction and a turbid brine, conditions which render the salt unsatisfactory for certain purposes, particularly for the curing of meat. The method of the present invention, however, is intended to produce a salt of an entirely different character than that resulting from these prior procedures and one which is highly satisfactory for uses to which a dry, free-flowing salt is not adapted.

One of the objects of the present invention is to provide an improved procedure for preparing salt which will result in a product characterized by the qualities of softness, moistness and ease in handling and working.

Another object is to provide a treated salt which when placed in solution produces a clear brine essentially neutral in reaction, and which possesses a marked tendency to adhere to and rapidly penetrate meat, thereby making it particularly well adapted for use in meat-curing operations.

A further object is to provide a method of the character described which is extremely simple in its procedural steps, requires no complicated or expensive equipment for its performance, and produces a superior product at a substantially lower cost than any other method now known to the art for attaining similar results.

Still another object is to provide as an article of commerce a rock or evaporated salt of novel composition which will remain soft, moist and in readily workable state under varying weather conditions, and which can be easily and quickly prepared by the incorporation therein of materials that in no way adversely affect its use or consumption as a food product.

These and other objects will appear more fully upon a consideration of the following description of the invention.

The essence of the present invention resides in the discovery that, if rock or evaporated salt in substantially bone-dry condition is treated with accurately controlled amounts of calcium chloride and water, the resulting product will remain soft and moist for relatively long periods of time even under extremely adverse weather conditions, will have a pronounced tendency to adhere to and rapidly penetrate meat and the like, and when placed in solution will produce a clear brine substantially neutral in reaction.

In treating salt in accordance with the invention, it is first necessary to prepare an aqueous solution of calcium chloride of definite, predetermined concentration, the proportions of the calcium chloride and water being selected in accordance with the character of the salt being treated and the expected atmospheric conditions to be encountered so as to insure that, after mixing with the salt, the moisture will be retained in the mixture by the hygroscopic action of the calcium chloride. While it has been found that the amounts of calcium chloride and water used in preparing the treating solution may be varied between 0.1% and 5% by weight of the amount of salt to be treated, it is believed that the best results will be obtained by using a solution wherein the amounts of calcium chloride and water are approximately 1% and 2%, respectively, by weight of the amount of the salt.

After the calcium chloride solution has been prepared, the next step in the process is to add the solution in proper amount to a quantity of dry rock or evaporated salt and to thoroughly mix the solution into the salt until the mixture becomes homogenous. Although the mixing is preferably carried out in equipment of the batch-mixing type, it will be understood that the procedure may be carried out continuously, if desired, by the use of suitable mechanical means. Upon completion of the mixing operation, the treated salt is ready for either storage or packaging in the usual manner.

The following description may be considered illustrative of the preferred embodiment of the invention. An aqueous solution of calcium chloride is first prepared by dissolving 2 pounds of calcium chloride in 4 pounds of water. A batch of 194 pounds of ground rock salt in substantially bone-dry condition is then placed in a mechanical mixer of the batch type, and the calcium chloride solution added thereto. The salt and calcium chloride solution are then mechanically mixed for a sufficient length of time to effect thorough distribution of the solution throughout the mass of the salt and to produce a homogenous mixture. When the mixing operation is completed, the treated salt may be either transferred to a storage bin or packaged for shipment.

The treatment of salt with calcium chloride solution as above described results in a product which is soft, moist, and readily handled or worked, and which will retain these characteristics for a considerable length of time even though subjected to widely varying atmospheric conditions. Although it is true that some of the salt produced in the United States contains a small amount of calcium chloride in its natural state, the percentage of calcium chloride found in this salt is not only variable and uncontrollable but is also so small that the salt quickly loses whatever characteristic of softness it may initially possess when it is subjected to a dry atmosphere. In accordance with the present invention, however, the amount of calcium chloride added to the salt is carefully controlled to produce a uniform product, and is so proportioned in relation to the amounts of salt and water that, due to its highly hygroscopic nature, sufficient moisture is retained in the salt to maintain the latter in a soft, moist condition even in extremely dry weather.

There is thus provided by the present invention a new and improved method of treating salt in such a way as to effectually maintain the salt in a soft, damp condition even though it may be exposed to adverse and rapidly variable atmospheric conditions. The salt produced by this method is minerally pure, contains no added constituents which are insoluble in water or which in any way adversely affect the edible character of the salt, and is particularly well adapted for such purposes as curing where it is desired that the salt adhere to and rapidly penetrate the meat or other substance being treated. Inasmuch as the method requires only a mechanical mixing of the calcium chloride, water and salt, it can be readily and cheaply carried out by the use of simple and inexpensive equipment and under such conditions as to insure a product of uniform quality.

What is claimed is:

1. A method of treating rock or evaporated salt for the purpose of maintaining it in soft, moist condition consisting of mixing with the salt an aqueous solution of calcium chloride wherein the amounts of calcium chloride and water are each between 0.1% and 5% by weight of the amount of the salt.

2. A method of treating rock or evaporated salt for the purpose of maintaining it in soft, moist condition consisting of mixing with the salt an aqueous solution of calcium chloride wherein the amounts of calcium chloride and water are approximately 1% and 2%, respectively, by weight of the amount of the salt.

3. A method of treating rock or evaporated salt for the purpose of maintaining it in soft, moist condition consisting of drying the salt to substantially bone-dry condition and then mixing therewith an aqueous solution of calcium chloride wherein the amounts of calcium chloride and water are each between 0.1% and 5% by weight of the amount of the salt.

4. A soft, moist salt consisting of a mixture of rock or evaporated salt, calcium chloride and water, the amounts of calcium chloride and water present in the mixture each being between 0.1% and 5% by weight of the amount of the salt.

5. A soft, moist salt consisting of a mixture of rock or evaporated salt, calcium chloride and water, the amounts of calcium chloride and water present in the mixture being approximately 1% and 2%, respectively, by weight of the amount of the salt.

MARNELL SEGURA.